Patented Aug. 6, 1940

2,210,368

UNITED STATES PATENT OFFICE 2,210,368

COMPOUNDS OF THE ETIO-CHOLANIC ACID SERIES AND PROCESS OF MAKING SAME

Max Hartmann, Riehen, and Albert Wettstein, Basel, Switzerland, assignors to the firm Society of Chemical Industry in Basle, Basel, Switzerland No Drawing. Application May 3, 1938, Serial No. 205,850. In Switzerland May 5, 1937

20 Claims. (Cl. 260—397)

This invention relates to an improvement in or modification of that described in application Serial No. 131,518 filed March 17, 1937. That specification describes a manufacture of ketones in which, inter alia, the double linking of nuclear saturated genins of the heart glucosides or their derivatives having an unsaturated α-lactone ring as a side chain is opened by oxidation and the β-ketocarboxylic acid thus produced is subjected to ketone scission.

The present invention relates to the manufacture of saturated or unsaturated compounds of the etio-cholanic acid series by treating a nuclear saturated or unsaturated genin of a heart glucoside or a derivative thereof, containing in the 17-position a β.α-unsaturated α-lactone ring, with an oxidizing agent, if desired with temporary protection of secondary nuclear hydroxyl groups and nuclear double linkings, and if desired subjecting to acid scission the β-ketocarboxylic acid intermediately produced. Finally, the compound of the etio-cholanic acid series which is formed may be treated with an agent for eliminating water for the purpose of removing in stages or completely the tertiary hydroxyl groups present, and the double linkings thus produced may be hydrogenated if desired.

It is to be understood that under the expression "saturated or unsaturated compounds of the etio-cholanic acid series" are included quite generally 10,13 - dimethyl - cyclopentanopolyhydrophenanthrene-17-carboxylic acids with any steric configuration and if desired containing further substituents.

Suitable parent materials are, for example, digoxigenin, sarmentogenin, digitoxigenin, gitoxigenin, periplogenin, uzarigenin, thevetigenin, calotropagenin, strophanthidin, ouabain, and derivatives thereof obtainable by esterifying, etherifying (for example with triarylcarbinols or with mono- or polysaccharides) or by partial or complete elimination of the tertiary hydroxyl groups in the form of water and, if desired, subsequent partial hydrogenation which does not change the unsaturated lactone ring. Especially suitable are the natural heart poisons themselves.

For the oxidation according to the present invention various methods are available, for example ozonization and scission of the ozonide, action of peroxides, for instance benzoperacid or hydrogen peroxide, preferably in the presence of osmium tetroxide, or addition of two hydroxyl groups at the double linking and scission by chromic acid or lead tetracetate of the glycol thus produced. In this manner the double linking of the unsaturated lactone ring is first opened. It is also possible, however, by a more deeply seated oxidation, for example by means of a permanganate or chromic acid, to degrade the lactone ring directly to the carboxyl group. In each case secondary hydroxyl groups are protected advantageously intermediately from the action of the oxidation by esterification or etherification and the nuclear double linkings, for example by addition of halogen or hydrogen halide.

The acid scission of any intermediately produced β-ketocarboxylic acid may be by the usual methods, for example by means of strong alkali or alkali alcoholate.

If the compounds of the etio-cholanic acid series thus produced contain tertiary hydroxyl groups, these may be removed in stages or completely with formation of nuclear unsaturated carboxylic acids by the action of an agent eliminating water, for example aqueous alcoholic mineral acid. The elimination of water can also be united with the acid scission.

By hydrogenation the nuclear unsaturated compounds may be converted into nuclear saturated compounds. If there has been only a partial elimination of water, and, if desired, hydrogenation, a further elimination of water and/or hydrogenation may be added.

The following diagram illustrates the application of the invention to digoxigenin.

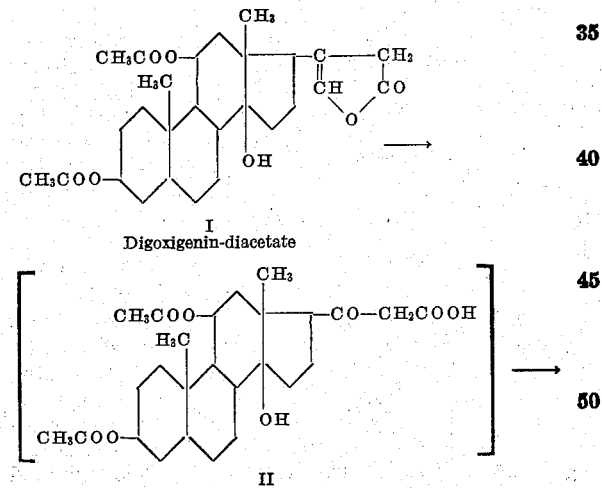

I
Digoxigenin-diacetate

II

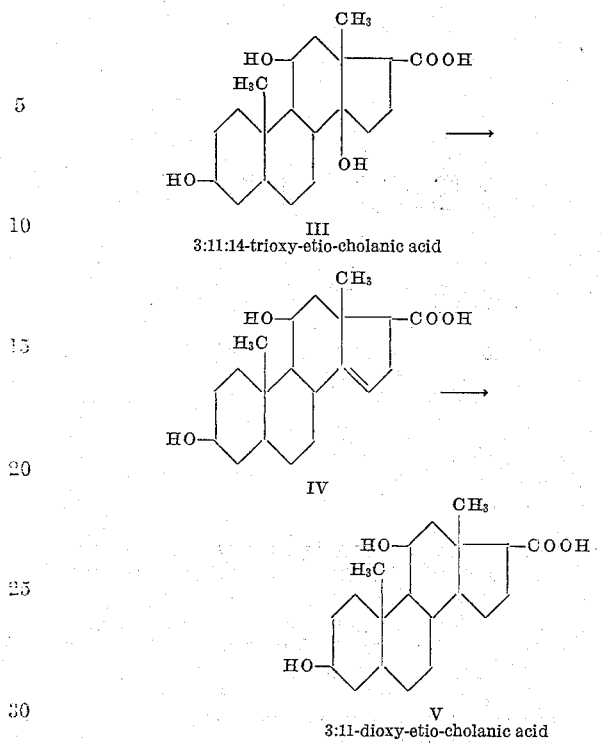

III
3:11:14-trioxy-etio-cholanic acid

IV

V
3:11-dioxy-etio-cholanic acid

If instead of digoxigenin other genins are used, other oxy-etio-cholanic- and allocholanic acids may be obtained.

The products of the invention are intermediate products for the production of valuable therapeutic compounds.

The following example illustrates the invention:

1 part by weight of digoxigenin-diacetate of the formula I of melting point 221° C. is suspended in glacial acetic acid and treated with ozone at a low temperature. The solution is strongly concentrated in a vacuum and the desired product is precipitated in the form of an oil by adding water, and the solvent is then poured off. The oil is heated in the boiling water bath with 2 parts of potassium hydroxide in a little alcohol of 50 per cent strength, while shaking, for several hours. The mass is then diluted with much water and the small proportion of neutral product is extracted with ether. From the aqueous phase there is obtained by addition of an equivalent proportion of acid the crude 3:11÷14-trioxy-etio-cholanic acid (III), which is not purified but is further worked up as such. From this crude product water is eliminated by several hours' heating with a solution of sulfuric acid of 5 per cent strength in alcohol of 50 per cent strength upon the boiling water bath. The mass is then shaken with cold alkali lye and ether. The neutral portions dissolved by the ether are subjected again to the above treatment after saponification with caustic alkali. The aqueous alkali portions which contain the carboxylic acid salt half dissolved and half emulsified are finally purified as follows: The ether is expelled from the alkaline phase and the product is precipitated by means of sulfuric acid and filtered. This residue, after addition of some mineral acid, is dissolved in ether, the ethereal solution is extracted with a little alkali lye, the aqueous phase is centrifuged and the supernatant solution of nearly colorless alkali salt is siphoned off. The alkali salt is now decomposed, after emulsification in ether, by means of dilute sulfuric acid, the ethereal solution is dried and evaporated and from the residue there is obtained by recrystallization from glacial acetic acid or acetone pure colorless 3:11-dioxy-aetio-cholenic acid (IV). The latter may be hydrogenated by means of platinum oxide in glacial acetic acid into 3:11-dioxy-aetio-cholanic acid (V), which also may be obtained pure by recrystallization from glacial acetic acid or acetone. The digoxigenin-diacetate may be ozonized, for example by treatment with ozone in a halogenated hydrocarbon strongly cooled, and the ozonide may be split by hydrogenating with hydrogen in solution in ethyl acetate. It is also possible to arrive at 3:11:14-trioxy-etio-cholanic acid by direct oxidation of digoxigenin-diacetate by means of a permanganate in acetone or of chromic acid in glacial acetic acid.

Instead of from digoxigenin-diacetate one may start, for instance, from 14-desoxy-digoxigenin-diacetate or anhydro-digoxigenin-diacetate. There is thus obtained on the one hand without final water elimination and hydrogenation the 3:11-dioxy-etio-cholanic acid, and on the other hand the 3:11-dioxy-etio-cholenic acid, it being advantageous before the ozonization to saturate the cyclic linking by means of 1 mol bromine and subsequently, for example, to restore it by hydrogenation by means of zinc and glacial acetic acid, alkali iodide in alcohol or catalytically. The dioxy-etio-cholenic acid thus produced may be hydrogenated to dioxy-etio-cholanic acid either simultaneously with the debromination or as a final operation.

Instead of the acetate other esters or ethers may be used, for instance acylated digilanides C or digoxins.

What we claim is:

1. The process for the manufacture of compounds of the etio-cholanic acid series comprising treating a compound of the group of genins of the heart glucosides and their esters and ethers containing in the 17-position a β, α-unsaturated α-lactone ring with oxidizing agents after temporary protection of free secondary nuclear hydroxyl groups.

2. The process for the manufacture of compounds of the etio-cholanic acid series comprising treating a compound of the group of genins of the heart glucosides and their esters and ethers containing in the 17-position a β, α-unsaturated α-lactone ring with oxidizing agents after temporary protection of free secondary nuclear hydroxyl groups, and finally with agents eliminating water for the purpose of removing tertiary hydroxyl groups present.

3. The process for the manufacture of compounds of the etio-cholanic acid series comprising treating a compound of the group of genins of the heart glucosides and their esters and ethers containing in the 17-position a β, α-unsaturated α-lactone ring with oxidizing agents after temporary protection of free secondary nuclear hydroxyl groups, then with agents eliminating water for the purpose of removing tertiary hydroxyl groups present and finally hydrogenating the double linkings thus produced.

4. The process for the manufacture of compounds of the etio-cholanic acid series comprising treating a compound of the group of genins of the heart glucosides and their esters and ethers containing in the 17-position a β, α-unsaturated α-lactone ring with a permanganate after temporary protection of free secondary nuclear hydroxyl groups, then with agents eliminating water for the purpose of removing tertiary hydroxyl groups present and finally hydrogenating the double linkings thus produced.

5. The process for the manufacture of compounds of the etio-cholanic acid series comprising treating digoxigenin with a permanganate after temporary protection of the secondary nuclear hydroxyl groups, then with agents eliminating water for the purpose of removing the tertiary hydroxyl group and finally hydrogenating the double linking thus produced.

6. The process for the manufacture of compounds of the etio-cholanic acid series comprising treating digoxigenin with a permanganate after temporary protection of the secondary nuclear hydroxyl groups by acylation, then with agents eliminating water for the purpose of removing the tertiary hydroxyl group and finally hydrogenating the double linking thus produced.

7. The process for the manufacture of compounds of the etio-cholanic acid series comprising treating digoxigenin with a permanganate after temporary protection of the secondary nuclear hydroxyl groups by acetylation, then with agents eliminating water for the purpose of removing the tertiary hydroxyl group and finally hydrogenating the double linking thus produced.

8. The process for the manufacture of compounds of the etio-cholanic acid series comprising treating an unsaturated compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups and nuclear double linkings.

9. The process for the manufacture of compounds of the etio-cholanic acid series comprising treating an unsaturated compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups by acylation and nuclear double linkings by halogen.

10. The process for the manufacture of compounds of the etio-cholanic acid series comprising treating an unsaturated compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups by acetylation and nuclear double linkings by bromine.

11. A process as claimed in claim 10 wherein anhydrodigoxigenin is used as starting material.

12. The process for the manufacture of compounds of the etio-cholanic acid series comprising treating a compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups, and subjecting to acid scission the $\beta$-ketocarboxylic acid intermediately produced.

13. The process for the manufacture of compounds of the etio-cholanic acid series comprising treating a compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups, subjecting to acid scission the $\beta$-ketocarboxylic acid intermediately produced and finally treating with agents eliminating water for the purpose of removing tertiary hydroxyl groups present.

14. The process for the manufacture of compounds of the etio-cholanic acid series comprising treating a compound of the group of genins of the heart glucosides and their esters and ethers containing in the 17-position a $\beta$, $\alpha$-unsaturated $\alpha$-lactone ring with oxidizing agents after temporary protection of free secondary nuclear hydroxyl groups, subjecting to acid scission the $\beta$-ketocarboxylic acid intermediately produced, then treating with agents eliminating water for the purpose of removing tertiary hydroxyl groups present and finally hydrogenating the double linkings thus produced.

15. The process for the manufacture of compounds of the etio-cholanic acid series comprising treating a compound of the group of genins of the heart glucosides and their esters and ethers containing in the 17-position a $\beta$, $\alpha$-unsaturated $\alpha$-lactone ring with ozone after temporary protection of free secondary nuclear hydroxyl groups, subjecting to acid scission the $\beta$-ketocarboxylic acid intermediately produced, then treating with agents eliminating water for the purpose of removing tertiary hydroxyl groups present and finally hydrogenating the double linkings thus produced.

16. A process for the manufacture of compounds of the etio-cholanic acid series comprising treating digoxigenin with ozone after temporary protection of the secondary nuclear hydroxyl groups, subjecting to acid scission the $\beta$-ketocarboxylic acid intermediately produced, then treating with agents eliminating water for the purpose of removing the tertiary hydroxyl group and finally hydrogenating the double linking thus produced.

17. A process for the manufacture of compounds of the etio-cholanic acid series comprising treating digoxigenin with ozone after temporary protection of the secondary nuclear hydroxyl groups by acylation, subjecting to acid scission the $\beta$-ketocarboxylic acid intermediately produced, then treating with agents eliminating water for the purpose of removing the tertiary hydroxyl group and finally hydrogenating the double linking thus produced.

18. A process for the manufacture of compounds of the etio-cholanic acid series comprising treating digoxigenin with ozone after temporary protection of the secondary nuclear hydroxyl groups by acetylation, subjecting to acid scission the $\beta$-ketocarboxylic acid intermediately produced, then treating with agents eliminating water for the purpose of removing the tertiary hydroxyl group and finally hydrogenating the double linking thus produced.

19. The 10,13 - dimethyl - cyclopentanopolyhydrophenanthrene-17-carboxylic acids containing in their nucleus three members of the group consisting of hydroxyl, esterified and etherified hydroxyl.

20. The 3,11,14-trihydroxy - 10,13 - dimethylcyclopentanopolyhydrophenanthrene-17-carboxlyic acid.

MAX HARTMANN.
ALBERT WETTSTEIN.